United States Patent [19]

Schild

[11] 4,143,950
[45] Mar. 13, 1979

[54] CAMERA

[75] Inventor: Josef Schild, Vienna, Austria

[73] Assignees: Ing. Karl Vockenhuber; DDr. Raimund Hauser, both of Vienna, Austria

[21] Appl. No.: 910,651

[22] Filed: May 30, 1978

[30] Foreign Application Priority Data

Jun. 6, 1977 [AT] Austria .................................. 3977/77

[51] Int. Cl.² ............................................ G03B 21/36
[52] U.S. Cl. ................................. 352/91 C; 352/141; 352/217
[58] Field of Search ................. 352/91 R, 91 C, 91 S, 352/141, 217

[56] References Cited

U.S. PATENT DOCUMENTS

| 3,549,249 | 12/1970 | Katsuyama | 352/91 S |
| 3,644,025 | 2/1972 | Katsuyama | 352/91 S |
| 3,950,083 | 4/1976 | Yoshimura et al. | 352/91 C |

Primary Examiner—Monroe H. Hayes
Attorney, Agent, or Firm—Martin A. Farber

[57] ABSTRACT

Motion picture camera, with an objective, in the light path of which, two exposure control devices, on the one hand a diaphragm and on the other hand a shutter, are adjustable by means of a common adjustment drive according to a predetermined program for changing of the light quantity which falls on a film per picture. An additional override, adjustment device is provided for at least one of said two exposure control devices for adjustment thereof independent of the predetermined program.

6 Claims, 6 Drawing Figures

CAMERA

The invention relates to a camera, in general, and more particularly to a motion picture camera, with an objective, in the light path of which, two exposure control devices, on the one hand a diaphragm and on the other hand a shutter, are adjustable by means of a common adjustment drive according to a predetermined program for changing of the light quantity which falls on a film per picture.

Such type of a photo camera for example is known from German Auslegeschrift AS 1,185.055, and such a motion picture camera from German Auslegeschrift. 1,027.983. It deals with comparatively simply constructed adjustment devices for both of the exposure control devices, whereby the program in general has the sense, first to close the diaphragm only at a predetermined value, in order consequently to avoid diffraction phenomenon, and after this with an unvarying or constant diaphragm to reduce the shutter speed and only then, to again reduce the diaphragm opening when the over-lighting is yet always too strong for an orderly or regular photographing. It is disadvantageous in the manner that with respect to the form of the photographing one is bound to the program, so that certain effects are not voluntarily able to be achieved with use of different depths of focus or definitions in depths. Precisely with motion picture cameras, an actuation of the shutter and/or diaphragm which is independent of the program is yet desired for the purpose of trick photography.

By the invention the described disadvantages are avoided in the manner that for at least one of these exposure control devices (e.g., 26; 15, 32), an additional override adjustment device (e.g., 40, 42, 58, 64) is provided for the purpose of adjustment thereof independent of the predetermined program (25, 27). Per se the application or input of voluntarily or arbitrarily determined values with an otherwise fixed, driven gear or drive was known to the expert in the form of mechanical mixers (that is a summation drive or differentiation drive) or also by decoupling of the part to be adjusted, from the gear or drive which forcibly or compulsorily adjusts it. The use of such known measures for solution of the problem on which the present invention is based, however heretofore was not proposed.

It is another object and feature of the invention in cooperation with the previously mentioned feature, to provide the override adjustment device with at least one mixing stage (e.g., 27, 37; 56, 57) for superimposing an additional exposure value.

In accordance with a further feature of the invention in cooperation with the above-mentioned features, the overriding adjustment device has a coupling (e.g., 30, 59-61) for decoupling the exposure control device (e.g., 15, 32) which is to be adjusted, from the common adjustment drive (22, 24), the latter impressing the program (25, 27) thereto.

Further in accordance with another cooperative feature of the invention, a change-over or switching device (45) is provided with the additional override adjustment device (40, 42) for the alternate drive of the override adjustment device by hand or via a motor, respectively, particularly, the camera motor (10).

Yet further in accordance with still another cooperative feature of the invention, a per se known device (31) for entering of exposure values (the exposure values being adjusted by the override adjustment device) in the closed-loop automatic exposure control circuit (19, 21), is able to be set out of operation by means of a disconnection device (64) for alternately achieving trick effects.

With the above and other objects and advantages in view, the present invention will become more clearly understood in connection with the following detailed description of preferred embodiments, when considered with the accompanying drawings, of which:

Figure 1:
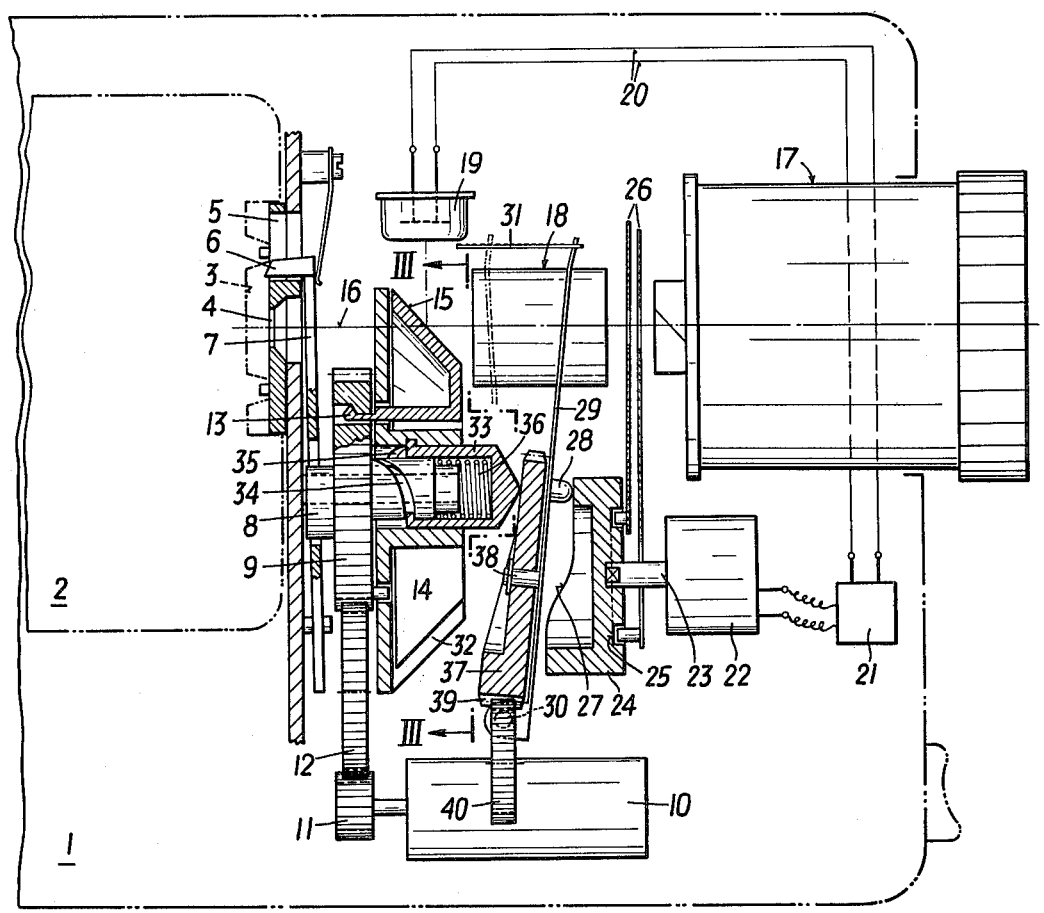
FIG. 1 shows a movie camera according to the invention with the essential parts in side view and in section, respectively.

Referring now to the drawings and more particularly to FIG. 1, in a camera 1 a cassette chamber is provided for insertion of a super-8 cassette 2. The cassette 2 has an opening 3 in which the film opens, i.e., is exposed. The opening 3 on the side of the camera lies opposite an aperture 4 as well as a slot 5. A claw or gripper tooth 6 grips or engages through this slot 5. The claw 6 is seated on a claw bar or platen 7, which is driven by a claw cam 8. The claw cam 8 is connected with a gear wheel 9, which gear wheel 9 is driven by means of a motor 10 with a motor pinion 11 via an intermediate gear 12.

By means of two driver claws 13, 14 (compare FIG. 3), a mirror shutter sector 15 is coupled with the gear wheel 9, the mirror surface of which lies on the optical axis 16, which optical axis is determined by a supplementary or front objective attachment 17 and a base objective 18. By the mirror surface of the sector 15, in a known manner, during the period of approximately one-half a rotation of the mirror, light is fed to a photoelectric transformer 19, the latter being connected via lines 20 with an exposure closed loop or control circuit 21. A servomotor 22 is connected to the output of the exposure control circuit. This servomotor 22 in principal can be of different formations, for example it can be formed by a magnet, a rotor- or stepping-motor. In the illustrated embodiment it deals however with a galvanometer 22. On a galvanometer shaft 23, there is fastened a cam body 24, which has positive locking (without slipping) cams 25 for control of two diaphragm blades 26. Moreover in addition to the diaphragm control cams 25 which are formed as radial cams in the front surface of the cam body 24 for longitudinally moving the respective blades 26 radially relative to the cam body 24, still an axial cam 27 is provided. A cam follower 28 is spring biased into frictional engagement or contact with the axial cam 27. The cam follower 28 is secured to a lever 29, which lever is pivotable about an axle 30. The lever 29 is connected on its upper side with a cover mask or a neutral or non-selective absorber or neutral density filter 31, the latter by means of the lever 29 being swung into the light path to the photoelectric transformer 19 (compare dashed position of the lever 29).

Figure 4:
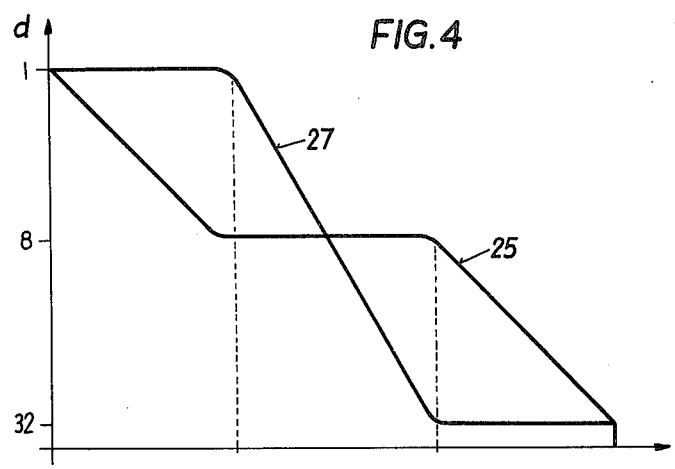
FIG. 4 shows the program curves for the control of the shutter and diaphragm.
Figure 3:
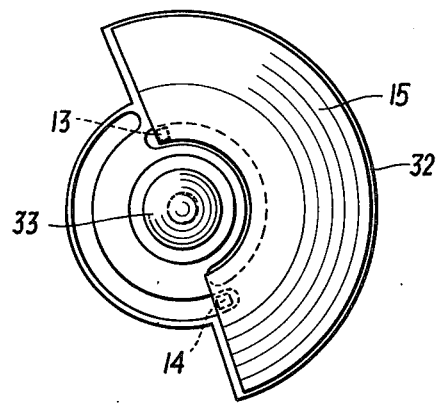
FIG. 3 is a view of the shutter taken along the lines III—III of FIG. 1.

As FIG. 3 clearly indicates, the shutter comprises two partial sectors 15, 32 which are mutually rotatable with respect to one another. A relative rotation of both sectors 15, 32 with respect to one another and consequently an enlargement or reduction of the angle of opening of the shutter is achieved in known manner by a sleeve 33, which engages in the helical line grooves 34, 35, which grooves respectively are joined or integral with one of the two sectors 15, 32. With an axial movement of the sleeve 33 counter to the force of a spring 36, consequently it turns in both grooves 34, 35, yet on the other hand the two sectors rotate 15, 32 relative to one another. Such a type of axial movement of the sleeve 33 is derived from the axial cam 27 via the cam follower 28 and the lever 29. In addition to this the relationship or ratio of the cams 25 and 27 is selected corresponding to FIG. 4, that is, starting out from the largest possible opening of the diaphragms 26, they are brought by means of the cams 25 during the adjustment, at first up to a diaphragm value of 8. During this time the shutter sectors 15, 32 occupy the position, as seen in FIG. 3, with the largest possible opening angle. However as soon as the diaphragm value 8 is reached, with further adjustment, the diaphragm is stopped or held stationary, whereas to the contrary the shutter 15, 32 is adjusted by means of the cam 27 until the smallest possible opening of the sectors is reached, for example corresponding aperture or opening at f 32. Should a further reduction of the light beam to the aperture 4 be required, thus by means of the cams 25, the diaphragm 26 likewise, if necessary, is brought to the smallest value, here thus to the f-number 32.

The previously described parts correspond to the state of the art. Now in order to make possible intentional voluntary deviations from the program given by the cams 25, 27 and illustrated in FIG. 4, on the lever 29 a cam wheel 37 is rotatably mounted on an axle 38 mounted on the lever. By rotation of the cam wheel 37 about the axle 38, an additional closing of the shutter sectors 15, 32 can be achieved beyond the position given by the cam 27. The arrangement of the cams 27, 37 constitute a mechanical summation drive. The cam wheel 37 on its edge has a toothing 39, in which a gear wheel 40 meshes or engages. This gear wheel 40 is either directly manually actuatable, in the manner that it projects partially through the side wall of the camera, yet it can also be driven, by means of a program control device for fading or changing over, from the camera motor 10, or by a separate motor. In this case the illustrated arrangement is particularly favorable, since only the cam wheel 37 is turned for the overriding adjustment of the shutter sectors 15, 32; however the lever 29 with the filter or the like 31 is not adjusted or controlled. The reduction (taking place for trick purposes) of the opening sector of the shutter thus does not enter or go into the control loop or circuit 21.

Figure 2:
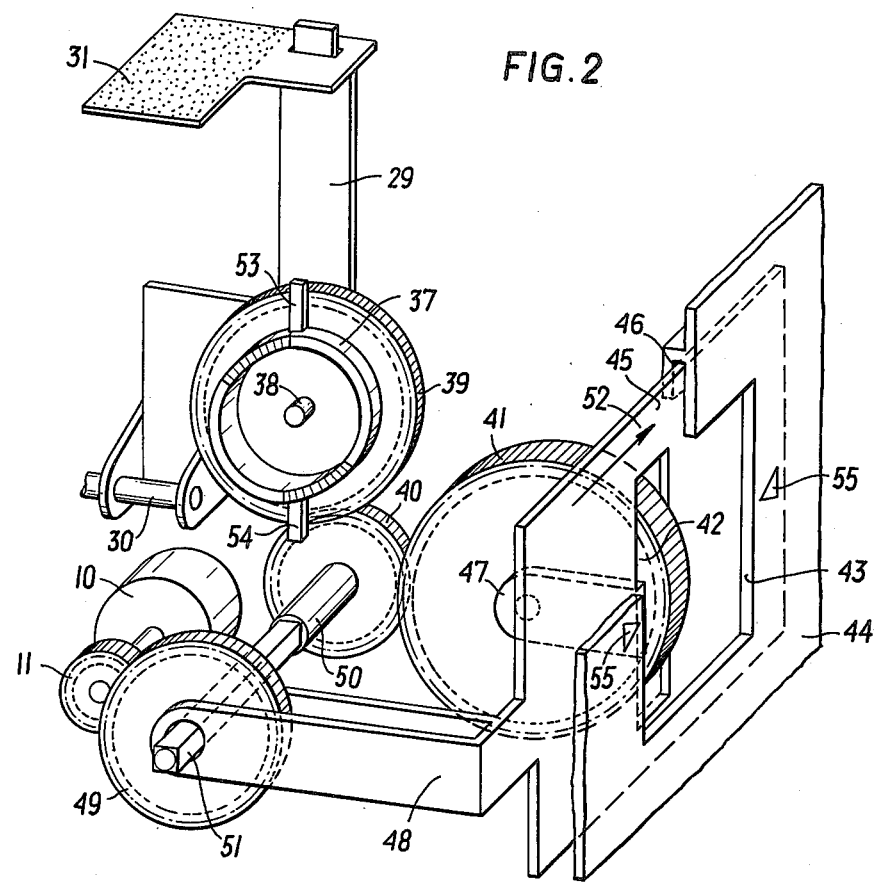
FIG. 2 illustrates a detail of a modified embodiment in isometric illustration and partly broken away.

FIG. 2 shows how the drive of the gear wheel 40 and of the cam disc 37, respectively, can take place. For this the gear wheel 40 engages or meshes in an outer toothing or gearing 41 of a hand wheel 42, the latter being actuatable from the outside of the camera. The hand wheel with a section thereof passes through an opening 43 of a camera housing wall 44. The opening 43 is dimensioned comparatively large and covered by a slider 45. By means of guides 46 (only one being illustrated), the slide 45 is displaceably guided on the camera wall 44. The hand wheel 42 is mounted on side pieces or rotation bearers 47 of the slide 45. A bearing fork 48 is provided on one end of the slide 45, which fork 48 surrounds an additional gear wheel 49 for guide purposes. The gear wheel 49 sits on the same shaft 50 as the gear wheel 40, however the shaft 50 in the vicinity of the gear wheel 49 is formed such that this gear wheel 49 is connected axially displaceably therewith, however jointly rotatable. In the illustrated embodiment example, the end of the shaft 50 is formed as a square 51.

In the position illustrated in FIG. 2, as mentioned, the hand wheel 42 is coupled with the gear wheel 40 for manual rotation of the cam wheel 37. If however the slide 45 is shifted by lateral pressure on the hand wheel 42 in the sense of the arrow 52, then the hand wheel 42 comes out of engagement from the gear wheel 40, whereas to the contrary, the gear wheel 49 gears into engagement with the motor pinion 11. If consequently in this position of the slide 45, the motor 10 (in non-illustrated, per se known manner) is placed in operation by pressing on a release or trip button 53 (compare FIG. 1), thus it drives the cam wheel 37 via the gear wheel 49, the square 51, the shaft 50 and the gear wheel 40, and depending upon the starting position of this cam wheel 37, consequently causes a fading in (opening of the shutter sectors) or dimming (closing of the shutter sectors). For proper timed switching off of the motor with a completely closed, or on the other hand, opened shutter, a corresponding switching-off cam, for example in the form of tripping or switching pins 53, 54, can be connected with the cam wheel 37 in a per se known manner, in the path of which pins 53, 54 there lies a switch (not illustrated) of the motor circuit. Purposefully the hand wheel 42 is provided with a scale or a similar indicator, which lies opposite correspondingly fixed marks 55 on the housing wall 44 or on the slider 45.

Should the camera 1 not be intended for trick photography, thus it is desired if a voluntary adjustment of the shutter for compensation or equalization entails a corresponding opposite movement of the diaphragm. In this case also via or over the filter 31 or the like, the prevailing respective position of the shutter must thus be entered in the exposure automatic closed loop control system 21 in the form of an electrical value.

Figure 5:
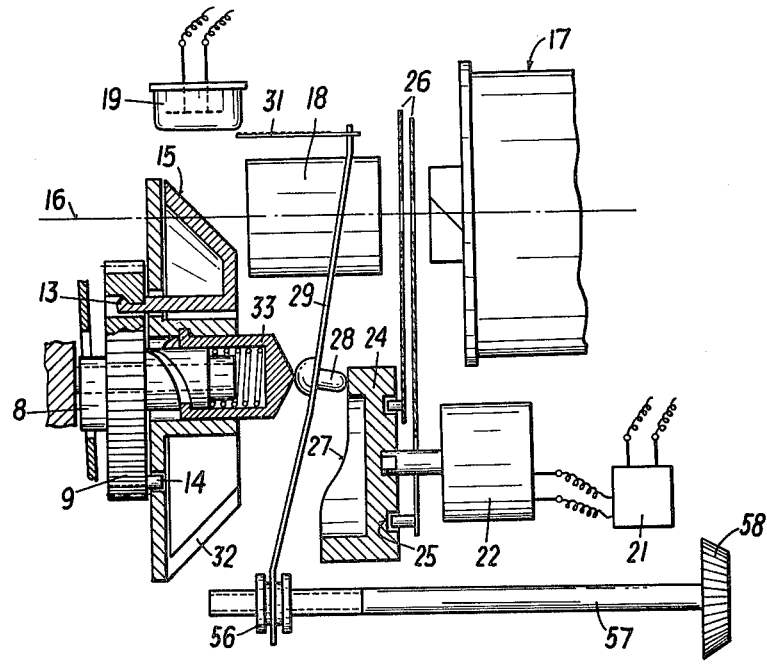
FIGS. 5 and 6 illustrate different embodiments of the invention in side view with parts in section.

FIG. 5 illustrates for example how this can occur. In this manner, in the vicinity of the cam follower 28 the lever 29 is formed bulged or spherical-like on both sides thereof and the lever 29 is pivoted on an adjusting sleeve 56. The adjusting sleeve 56 can either be adjusted manually by means of a screw spindle 57 and a turning knob 58 as illustrated, the latter moreover being able to be grasped and turned on the outside of the camera 1. In this manner, for example, exposure correction values for countre jour, against the light or also exposure index or film speed sensitivity values can be read-in or entered. For the entry of the exposure index or sensitivity values, the arrangement can also be made such that a per se known sensor drive (not-illustrated) for sensing the sensitivity coding of the cassette 2 (compare FIG. 1) carries out the twisting rotation of the screw spindle 57. The screw spindle 57 is mounted rotatably yet axially immovably in that camera housing and is threaded into the threaded sleeve 56, the latter being non-rotatably mounted. When the spindle 57 is rotated via the knob 58 in and relative to the sleeve 56, the latter is displaced axially along the spindle 57, causing a movement of the lever 29 secured thereon and an adjustment of the sectors 15, 32 and of the filter 31 (the entering device of the shutter position or exposure value). The advantage of the arrangement illustrated in FIG. 5 lies in that not only does a mere summation of the values resulting from the program and from the voluntary input take place, but after the closing of the shutter by means of the axial cam 27, also an opening of the shutter sectors 15, 32 can be achieved again by means of a rotation of the screw spindle 57. Under circumstances if necessary, however, also a combination of the constructions according to FIGS. 1 and 5 is possible, that is also mounting of a cam wheel 37 on the lever 29, consequently in order with an arrangement according to FIG. 5, also to be able to perform cross-fadings, fading-in or -out, without therefore influencing the exposure control circuit 21 in a non-desired manner.

Figure 6:
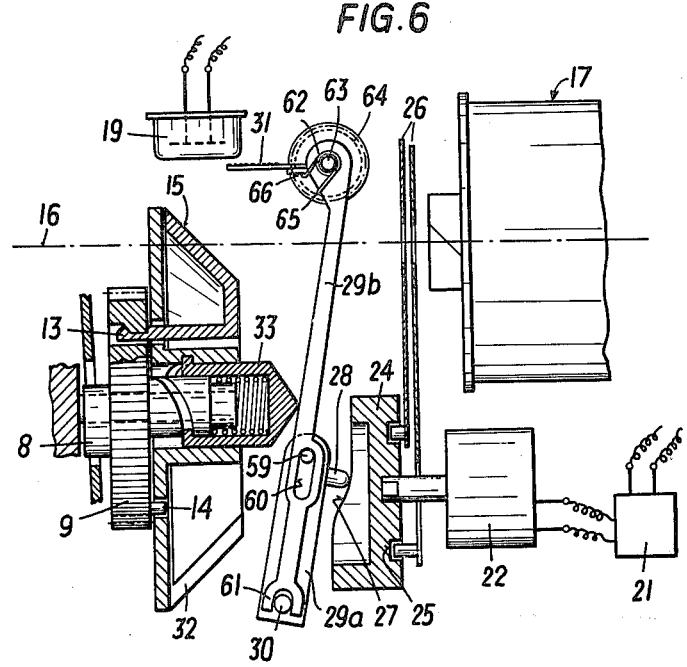

FIG. 6 illustrates a further possibility by which the axial cam 27 via the cam follower 28 adjusts or regulates a partial lever 29a, the latter being rotatable about the axle 30. A second partial lever 29b is coupled with the partial lever 29a. The coupling can, for example, be provided by friction grip or friction contact; in the illustrated embodiment however it takes place in the manner that a pin 59 is provided on the lever 29a, and the axle 30 is extended pin-like. Correspondingly the partial lever 29b has a longitudinal hole 60 (surrounding the pin 59) and a fork 61, which fork straddles on the pin-like lengthened axle 30. The partial lever 29b under the circumstances if necessary can be held by a comparatively weak spring (not illustrated) in the position illustrated in FIG. 6, in which the two partial levers 29a, 29b are coupled to, and operate as, a single lever.

On its end lying opposite to the fork 61, the lever 29b has a moveable bearing or mounting 62 for a shaft 63, on the end of which shaft there is mounted an actuation button or knob 64, which actuation button is also rotatable and controllable from the outside of the camera 1. With the aid and cooperation of the actuation button 64 and shaft 63, which are displaceably mounted in the camera housing, the partial lever 29b can be lifted up along the longitudinal hole 60, and consequently the fork 61 can be brought out of engagement from the pin-like extended axle 30. Thereafter the lever 29b can be easily pivoted or turned at will about the pin 59 as an axis in the sense of an opening or closing of the shutter sectors 15, 32.

Also the filter 31 or the like is connected with the shaft 63 and by a leg spring or lever spring 65 is pressed against an abutment 66 of the lever 29b. The button 64 thus constitutes an override adjustment device for superimposing an adjustment of the shutter sectors 15, 32 additional to that due to the cam 27 as well as controlling the shutter position exposure valve for feed back to the automatic control loop 19, 21 by simultaneously adjusting the movement of the filter 31 in the light path to the photoelectric transformer 19, the filter 31 being carried on the abutment 66. The button 64 also constitutes a disconnection device for inoperatively positioning the exposure valve entry member 31. In this respect if one now wants to avoid the entering of the shutter position as a value for the exposure control circuit 21, for achieving of trick effects, one only need to tilt the filter 31 or the like away from the light path to the photoelectric transformer 19 now by rotation of the actuation button 64 counter to the action of the leg spring 65.

Within the scope of the invention numerous different embodiments are possible. As already mentioned, the coupling of both of the levers 29a, 29b can take place in a friction contact positive manner. Instead of the pin-like extended axle 30, then merely a catch or stop is to be provided, in which instead of the fork 61, a counter catch or counter stop of the lever 29b is capable of catching or falling-in. If this catch however is released, thus then the lever 29b can swing about the pin 59 as an axle, thus in this case it does not need to be axially lifted up, so that also the longitudinal hole 60 is eliminated and done without. Furthermore it is clear that instead of a voluntary override adjustment of the shutter sectors 15, 32, also a voluntary override adjustment of the diaphragm under the circumstances if necessary is thinkable in combination with the shutter.

While I have disclosed several embodiments of the present invention it is to be understood that these are given by examples only and not in a limiting sense.

I claim:

1. Camera, particularly a motion picture camera with an objective, defining a light path aligned with respective pictures of a film, comprising
    two exposure control devices comprising a diaphragm and a shutter operatively disposed in the light path,
    a common adjustment drive means for adjusting said diaphragm and said shutter according to a predetermined program for variation of the light quantity falling on each picture of the film,
    an additional override adjustment means for adjustment of at least one of said two exposure control devices independently of the predetermined program.

2. The camera according to claim 1, wherein
    said override adjustment means includes at least one mixing stage means for superimposing an additional exposure value on said at least one of said exposure control devices.

3. The camera according to claim 1, wherein
    said override adjustment means includes coupling means for decoupling said at least one of said exposure control devices from said common adjustment drive means, the latter including means for impressing a program on said exposure control devices.

4. The camera according to claim 1, further comprising
    a motor,
    a change over means, operatively connected with said additional override adjustment means, for alternate driving of said adjustment device by hand and via said motor, respectively.

5. The camera according to claim 4, wherein
    said motor constitutes a camera motor means for normally operating the camera.

6. The camera according to claim 1, wherein
    said override adjustment means further for regulating exposure values,
    an exposure control circuit operatively connected to said common adjustment drive means,
    means for entering exposure values in said exposure control circuit,
    disconnection means for setting said entering means out of operation for an alternate achieving of trick effects.

* * * * *